United States Patent
Wilhelmsson et al.

(10) Patent No.: US 12,466,419 B2
(45) Date of Patent: Nov. 11, 2025

(54) METHOD OF CONTROLLING A VEHICLE OPERATION

(71) Applicant: VOLVO TRUCK CORPORATION, Gothenburg (SE)

(72) Inventors: Martin Wilhelmsson, Gothenburg (SE); Mattias Johansson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 298 days.

(21) Appl. No.: 18/305,557

(22) Filed: Apr. 24, 2023

(65) Prior Publication Data
US 2023/0339488 A1 Oct. 26, 2023

(30) Foreign Application Priority Data

Apr. 26, 2022 (EP) .................................... 22170031

(51) Int. Cl.
*B60W 50/08* (2020.01)
*B60W 50/00* (2006.01)

(52) U.S. Cl.
CPC ...... *B60W 50/085* (2013.01); *B60W 50/0097* (2013.01); *B60W 2050/0062* (2013.01)

(58) Field of Classification Search
None
See application file for complete search history.

(56) References Cited

U.S. PATENT DOCUMENTS

| | | | |
|---|---|---|---|
| 2019/0143953 A1 | 5/2019 | Jang | |
| 2019/0176632 A1* | 6/2019 | Treharne | B60L 53/14 |
| 2020/0070679 A1* | 3/2020 | Wang | B60L 58/21 |
| 2020/0087889 A1 | 3/2020 | Fritz | |
| 2020/0294323 A1* | 9/2020 | Zeng | G07C 5/085 |
| 2021/0146785 A1 | 5/2021 | Wang et al. | |
| 2022/0074763 A1* | 3/2022 | Haran | H04W 4/12 |
| 2022/0080806 A1* | 3/2022 | Lavrich | B60W 50/14 |

(Continued)

FOREIGN PATENT DOCUMENTS

| | | |
|---|---|---|
| EP | 1195508 A2 | 4/2002 |
| EP | 1195508 A3 | 1/2004 |
| FR | 2992350 A1 | 12/2013 |

(Continued)

OTHER PUBLICATIONS

Extended European Search Report in corresponding European Application No. 22170031.3 dated Oct. 17, 2022 (8 pages).

*Primary Examiner* — Amelia Vorce
(74) *Attorney, Agent, or Firm* — Venable LLP; Jeffri A. Kaminski

(57) ABSTRACT

A computer implemented method controls vehicle operation. The vehicle has vehicle components operable by processing circuitry based on predicted user behavior. The method includes receiving, by the processing circuitry, a signal indicative of a current user behavior for a user currently operating the vehicle; comparing, by the processing circuitry, the current user behavior with a predicted user behavior. When a difference between the current user behavior and the predicted user behavior is above a predetermined threshold limit: new user behavior based on the current user behavior is formed and operation of at least one of the vehicle components is controlled using the new user behavior.

13 Claims, 4 Drawing Sheets

(56) References Cited

U.S. PATENT DOCUMENTS

2022/0290596 A1* 9/2022 Fried .................... F01N 9/00
2022/0348185 A1* 11/2022 Le ..................... B60W 20/13

FOREIGN PATENT DOCUMENTS

| WO | 2014191008 A1 | 12/2014 |
| WO | 2018002119 A1 | 1/2018 |
| WO | 2021229034 A1 | 11/2021 |

* cited by examiner

METHOD OF CONTROLLING A VEHICLE OPERATION

TECHNICAL FIELD

The present invention relates to a computer implemented method of controlling a vehicle operation. In particular, the method is forming new user behavior and controls the operation of a vehicle component based on the new user behavior when a current user behavior is different from a predicted user behavior. The present invention also relates to a vehicle control system as well as a vehicle comprising such a vehicle control system. Although the invention will mainly be directed to a vehicle in the form of a truck, the invention may also be applicable for other types of vehicles using predicted user behavior for controlling operation of various vehicle components, such as e.g., cars, buses, working machines, and other transportation vehicles.

BACKGROUND

The user behavior of a vehicle operator is becoming common for controlling operation of various vehicle components. In detail, different operating conditions of a vehicle component are controlled based on historical data relating to the characteristic operation of the user normally operating the vehicle. For example, the regeneration of an engine aftertreatment system can be performed at suitable time periods based on the driving characteristics by the operator of the vehicle.

The vehicle control system hereby collects data over time to make a proper prediction of how the vehicle is operated. However, when the vehicle is sold to a new user, or when the vehicle is suddenly operating a different driving route, i.e. the vehicle is used for a new assignment, there is a risk that the vehicle components are controlled at a "wrong" point in time when it is rather un-beneficial to control the vehicle component in a certain manner.

There is thus a desire to further develop a control strategy for controlling vehicle components based on predicted user behavior.

SUMMARY

It is thus an object of the present invention to at least partially overcome the above described deficiencies.

According to a first aspect, there is provided a computer implemented method of controlling a vehicle operation of a vehicle, the vehicle comprising vehicle components operable by processing circuitry based on predicted user behavior, the method comprising receiving, by the processing circuitry, a signal indicative of a current user behavior for a user currently operating the vehicle; comparing, by the processing circuitry, the current user behavior with a predicted user behavior; and when a difference between the current user behavior and the predicted user behavior is above a predetermined threshold limit: forming, by the processing circuitry, new user behavior based on the current user behavior; and controlling, by the processing circuitry, operation of at least one of the vehicle components using the new user behavior.

The definition of forming new user behavior based on the current user behavior should be construed such that the processing circuitry is using the data relating to the current user behavior to set a new schedule as to when to control the at least one vehicle component. Preferably, and according to an example embodiment, the processing circuitry, may remove historical data relating to the predicted user behavior when the difference between current user behavior and the predicted user behavior is above a predetermined threshold limit. Hereby, all data relating to e.g. the previous user, or previous user action, of the vehicle is removed such that only the new data relating to the current user, or current user action, is used when subsequently controlling the at least one vehicle component.

The processing circuitry may include a microprocessor, microcontroller, programmable digital signal processor or another programmable device. The processing circuitry may also, or instead, each include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry (or generally discussed as "processing circuitry") may be at least partly integrated with an upper layer vehicle control system.

The present invention is based on the insight that by forming new user behavior when it is determined that a new user is operating the vehicle, or when the vehicle is operated in a different transport mission compared to previous transport missions, it is beneficial to form new user behavior to be used when controlling operation of the vehicle components. An advantage of the present invention is that a more rapid convergence to the new user behavior can be provided when forming new user behavior if the current user behavior differs from the predicted user behavior. Accordingly, the time period for adapting to the new user behavior can be substantially shorter. As a consequence, the total performance of the vehicle will be improved as the fuel consumption can be reduced, the driveability be improved, etc. Also, by forming new user behavior to be used for controlling the vehicle component(s), there is a reduced risk of erroneously controlling the vehicle component(s) at a point in time when it is, for some reason, not beneficial to do so.

According to an example embodiment, the step of removing the historical data may be executed by the processing circuitry prior to forming the new user behavior. Hereby, a faster adaption to the new user behavior can be performed since the old, and no longer accurate, data is no longer taken into consideration.

According to an example embodiment, the current user behavior may be compared with the predicted user behavior for a predetermined time period when the user is currently operating the vehicle. An advantage of using a time factor is that slight differences in operation can be accepted, whereby new user behavior is not formed directly when the vehicle is operated in a slightly different way. Thus, the time factor takes into consideration that the current user behavior should be rather substantial from the predicted user behavior for new user behavior to be formed. Preferably, and according to an example embodiment, the processing circuitry may form new user behavior when the difference between the current user behavior and the predicted user behavior is above the predetermined threshold limit throughout the predetermined time period.

According to an example embodiment, the predicted user behavior may be a predicted time period of a day at which the user is predicted to operate the vehicle. Accordingly, if the vehicle is suddenly operated during a different time period of the working day compared to previous operation, this can be an indication of a new user operating the vehicle. Hence, and according to an example embodiment, the difference between the current user behavior and the predicted user behavior may be above the predetermined threshold limit when the vehicle is currently operated at time period different from the predicted time period.

According to an example embodiment, the predicted user behavior may be a road path at which the user is predicted to operate the vehicle. This may also be an indicator that the transport mission is changed, and a new user behavior should be formed. Accordingly, and according to an example embodiment, the difference between the current user behavior and the predicted user behavior may be above the predetermined threshold limit when the vehicle is currently operated at a road path different from the predicted road path.

According to an example embodiment, the predicted user behavior may be a power consumption of the vehicle during a predetermined time period. Users conventionally operates their vehicles in different manners, where some users are more "aggressive", i.e. operates the vehicle with a relatively high power consumption, while other operates are more moderate in their operation resulting in a lower power consumption. The power consumption can thus be an indicator of a new user operating the vehicle. Accordingly, and according to an example embodiment, the difference between the current user behavior and the predicted user behavior may be above the predetermined threshold limit when the current power consumption falls outside a predetermined power consumption range during a predetermined time period.

According to an example embodiment, the predicted user behavior may be a vehicle speed of the vehicle during a predetermined time period. In a similar vein as the power consumption, users conventionally operates their vehicles in different manners, where some users are driving at higher speed compared to other users. The vehicle speed can thus be an indicator of a new user operating the vehicle. Accordingly, and according to an example embodiment, the difference between the current user behavior and the predicted user behavior may be above the predetermined threshold limit when the current vehicle speed falls outside a predetermined vehicle speed range during a predetermined time period.

According to an example embodiment, the vehicle component may be an engine aftertreatment system, wherein the method may comprise controlling, by the processing circuitry, the engine aftertreatment system to regenerate at a predetermined time interval based on the new user behavior. Hereby, there is a reduced risk of regenerating the engine aftertreatment system in e.g. a city environment, or at other unbeneficial locations.

According to an example embodiment, the vehicle component may be an electric power system of the vehicle, wherein the method may comprise controlling, by the processing circuitry, to feed electric power to an energy storage system of the vehicle based on the new user behavior. As an example, the energy storage system can be regenerated with electric power at time periods when it is beneficial to do so. If the processing circuitry, based on the new user behavior, determines that the vehicle will be operated at a long downhill road path at an upcoming point in time, the processing circuitry may control the electric power system to await any electric power regeneration until the vehicle arrives at that downhill road path to avoid the energy storage system to exceed a maximum state of charge level, at which electric power in such case would need to be dissipated in other ways.

According to an example embodiment, the vehicle may comprise a human machine interface module connected to the control circuitry and operable by the user, wherein the method may comprise transmitting, by the processing circuitry, a verification signal to the human machine interface, forming, by the processing circuitry, new user behavior based on the current user behavior upon receiving a confirmation request from the user. Hereby, the user is able to confirm if he/she is a new user, or control the processing circuitry to disregard the action of forming new user behavior, i.e. to keep the predicted user behavior for future operation.

According to a second aspect, there is provided a vehicle control system for controlling a vehicle operation, the vehicle control system comprising a control unit comprising processing circuitry configured to control operation of at least one vehicle component, the processing circuitry being configured receive a signal indicative of a current user behavior for a user currently operating the vehicle; compare the current user behavior with a predicted user behavior; and when a difference between the current user behavior and the predicted user behavior is above a predetermined threshold limit: form new user behavior based on the current user behavior; and control operation of the at least one vehicle component using the new user behavior.

Effect and features of the second aspect are largely analogous to those described above in relation to the first aspect, and embodiments thereof.

According to a third aspect, there is provided a computer program comprising program code means for performing the steps of any one of the embodiments described above in relation to the first aspect when the program is run on a computer.

According to a fourth aspect, there is provided a computer readable medium carrying a computer program comprising program means for performing the steps of any one of the embodiments described above in relation to the first aspect when the program means is run on a computer.

According to a fifth aspect, there is provided a vehicle comprising a vehicle control system according to the second aspect.

Effect and features of the third, fourth and fifth aspects are largely analogous to those described above in relation to the first aspect, and embodiments thereof.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
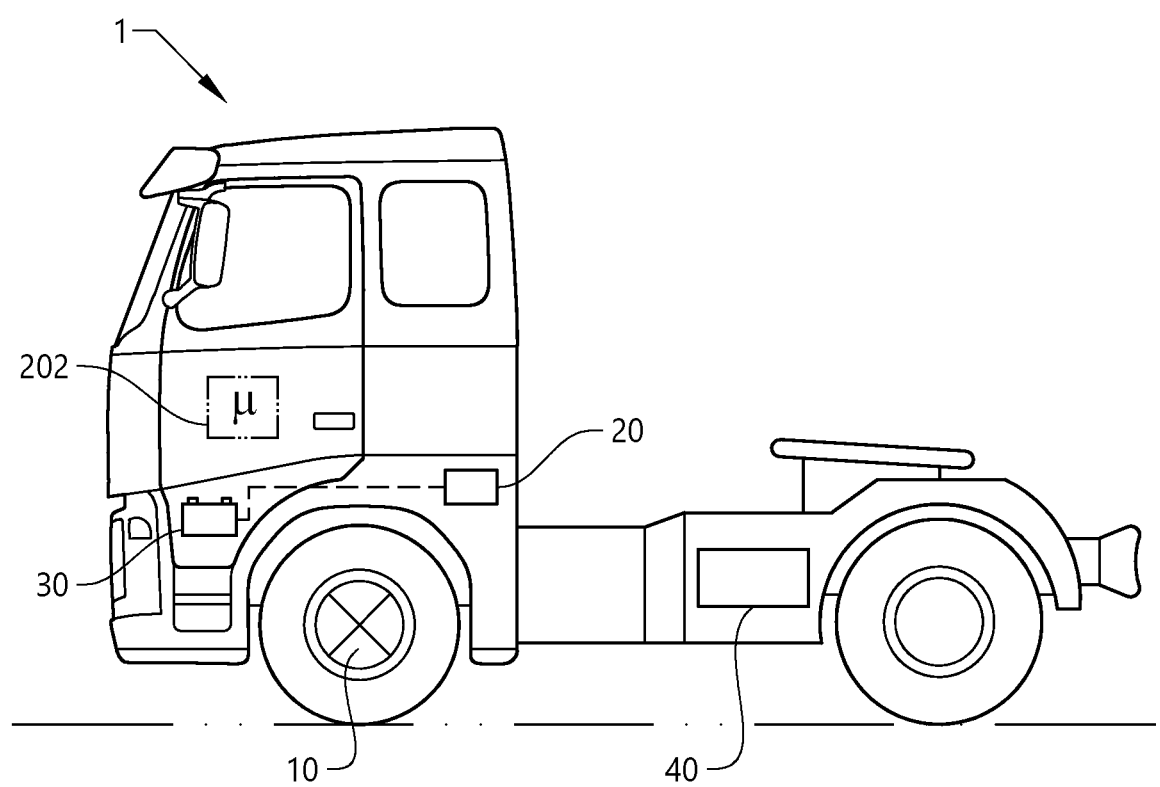
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

With particular reference to FIG. 1, there is provided a vehicle 1 in the form of a truck. The vehicle 1 comprises a prime mover. The prime mover may, for example, be an internal combustion engine (not shown), one or more electric machines 10, a hydrogen internal combustion engine (not shown), etc. The vehicle 1 may also, as indicated in FIG. 1, comprise a fuel cell 20 configured to generate electric power which is fed to either the electric machine 10 or to an energy storage system 30 of the vehicle 1. Moreover, the exemplified vehicle 1 in FIG. 1 also comprises an engine aftertreatment system 40 arranged downstream the internal combustion engine or the hydrogen internal combustion engine, whichever type of prime mover being implemented in the vehicle. Each of the electric machine 10, the fuel cell 20, the energy storage system 30 and the engine aftertreatment system 40 forms a respective vehicle component of the vehicle 1. It should thus be readily understood that the vehicle 1 comprises even further vehicle components that falls within this definition and forms part of the below described invention.

The vehicle 1 further comprises a control unit 202 connected to the vehicle component. In detail, and with particular reference to the exemplified vehicle 1 in FIG. 1, the control unit 202 comprises processing circuitry coupled to the electric machine 10, the fuel cell 20, the energy storage system 30 and the engine aftertreatment system 40. The processing circuitry thus controls each of these vehicle components.

The processing circuitry may include a microprocessor, microcontroller, programmable digital signal processor or another programmable device. The processing circuitry may also, or instead, each include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry (or generally discussed as "processing circuitry") may be at least partly integrated with an upper layer vehicle control system (not shown).

Figure 2:
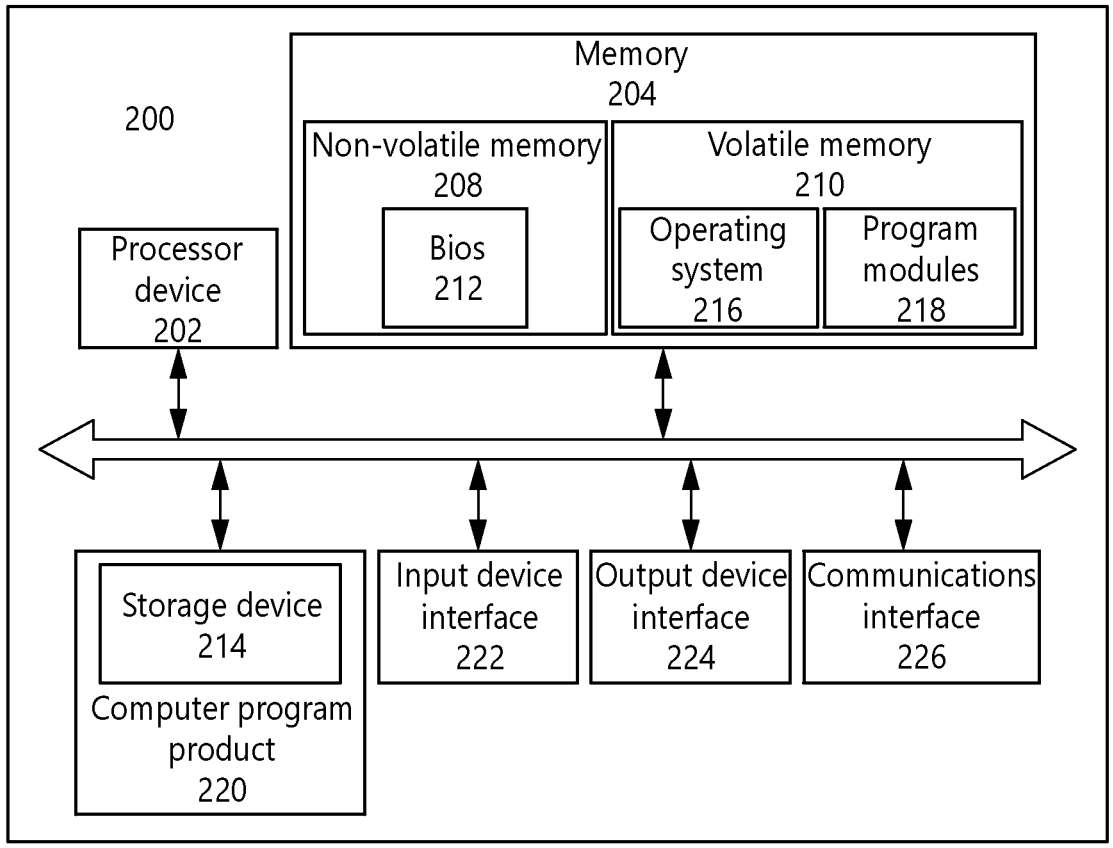
FIG. 2 is a schematic diagram of a computer system for implementing examples disclosed herein, according to an example embodiment.

Turning now to FIG. 2, which is a schematic diagram of a computer system 200 for implementing examples disclosed herein. The computer system 200 is adapted to execute instructions from a computer-readable medium to perform these and/or any of the functions or processing described herein. The computer system 200 may be connected (e.g., networked) to other machines in a LAN, an intranet, an extranet, or the Internet. While only a single device is illustrated, the computer system 200 may include any collection of devices that individually or jointly execute a set (or multiple sets) of instructions to perform any one or more of the methodologies discussed herein.

The computer system 200 may comprise any computing or electronic device capable of including firmware, hardware, and/or executing software instructions to implement the functionality described herein. The computer system 200 includes the above described control unit 202 (also referred to as a processor device), a memory 204, and a system bus 206. The system bus 206 provides an interface for system components including, but not limited to, the memory 204 and the processor device 202. The processor device 202 may include any number of hardware components for conducting data or signal processing or for executing computer code stored in memory 204. The processor device 202 (i.e., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 206 may be any of several types of bus structures that may further interconnect to a memory bus (with or without a memory controller), a peripheral bus, and/or a local bus using any of a variety of bus architectures. The memory 204 may be one or more devices for storing data and/or computer code for completing or facilitating methods described herein. The memory 204 may include database components, object code components, script components, or other types of information structure for supporting the various activities herein. Any distributed or local memory device may be utilized with the systems and methods of this description. The memory 204 may be communicably connected to the processor device 202 (e.g., via a circuit or any other wired, wireless, or network connection) and may include computer code for executing one or more processes described herein. The memory 204 may include non-volatile memory 208 (e.g., read-only memory (ROM), erasable programmable read-only memory (EPROM), electrically erasable programmable read-only memory (EEPROM), etc.), and volatile memory 210 (e.g., random-access memory (RAM)), or any other medium which can be used to carry or store desired program code in the form of machine-executable instructions or data structures and which can be accessed by a computer or other machine with a processor device 202. A basic input/output system (BIOS) 212 may be stored in the non-volatile memory 208 and can include the basic routines that help to transfer information between elements within the computing device 200.

The computing device 200 may further include or be coupled to a non-transitory computer-readable storage medium such as the storage device 214, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 214 and other drives associated with computer-readable media and computer-usable media may provide non-volatile storage of data, data structures, computer-executable instructions, and the like.

A number of modules can be stored in the storage device 214 and in the volatile memory 210, including an operating system 216 and one or more program modules 218, which may implement the functionality described herein in whole or in part. All or a portion of the examples disclosed herein may be implemented as a computer program product 220 stored on a transitory or non-transitory computer-usable or computer-readable storage medium (i.e., single medium or multiple media), such as the storage device 214, which includes complex programming instructions, such as complex computer-readable program code, to cause the processor device 202 to carry out the steps described herein. Thus, the computer-readable program code can comprise software instructions for implementing the functionality of the examples described herein when executed by the processor device 202. The processor device 202 may serve as a controller, or control system, for the computing device 200 that is to implement the functionality described herein.

The computer system 200 also may include an input device interface 222 (e.g., input device interface and/or output device interface). The input device interface 222 may be configured to receive input and selections to be communicated to the computer system 200 when executing instructions, such as from a keyboard, mouse, touch-sensitive surface, etc. Such input devices may be connected to the processor device 202 through the input device interface 222 coupled to the system bus 206 but can be connected through other interfaces such as a parallel port, an Institute of Electrical and Electronic Engineers (IEEE) 1394 serial port, a Universal Serial Bus (USB) port, an IR interface, and the like. The computer system 200 may include an output device interface 224 configured to forward output, such as to a display, a video display unit (e.g., a liquid crystal display (LCD) or a cathode ray tube (CRT)). The computing device 200 may also include a communications interface 226 suitable for communicating with a network as appropriate or desired.

The operational steps described in any of the exemplary embodiments herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

Figure 3:
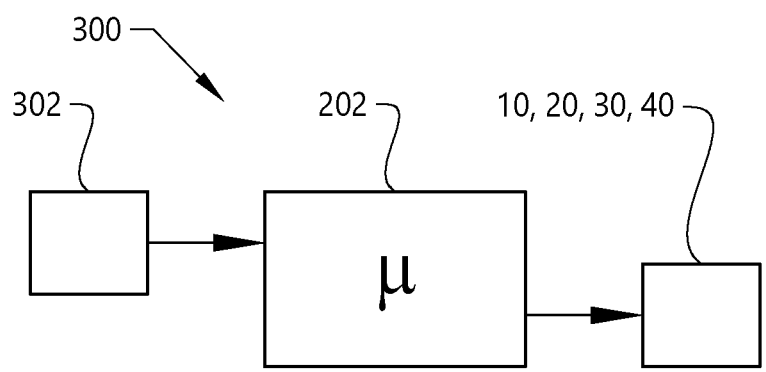
FIG. 3 is a schematic illustration of a vehicle control system for controlling a vehicle operation according to an example embodiment.
Figure 5A:
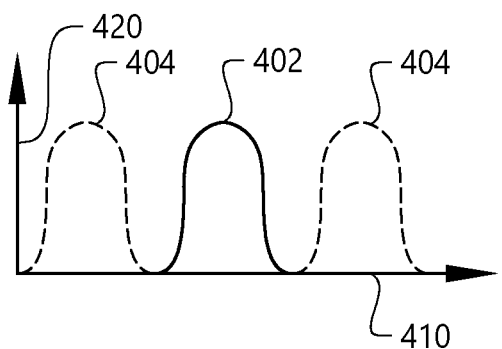
FIGS. 5a-5c are graphs illustrating the operation of a vehicle component using the inventive method according to an example embodiment.
Figure 6:
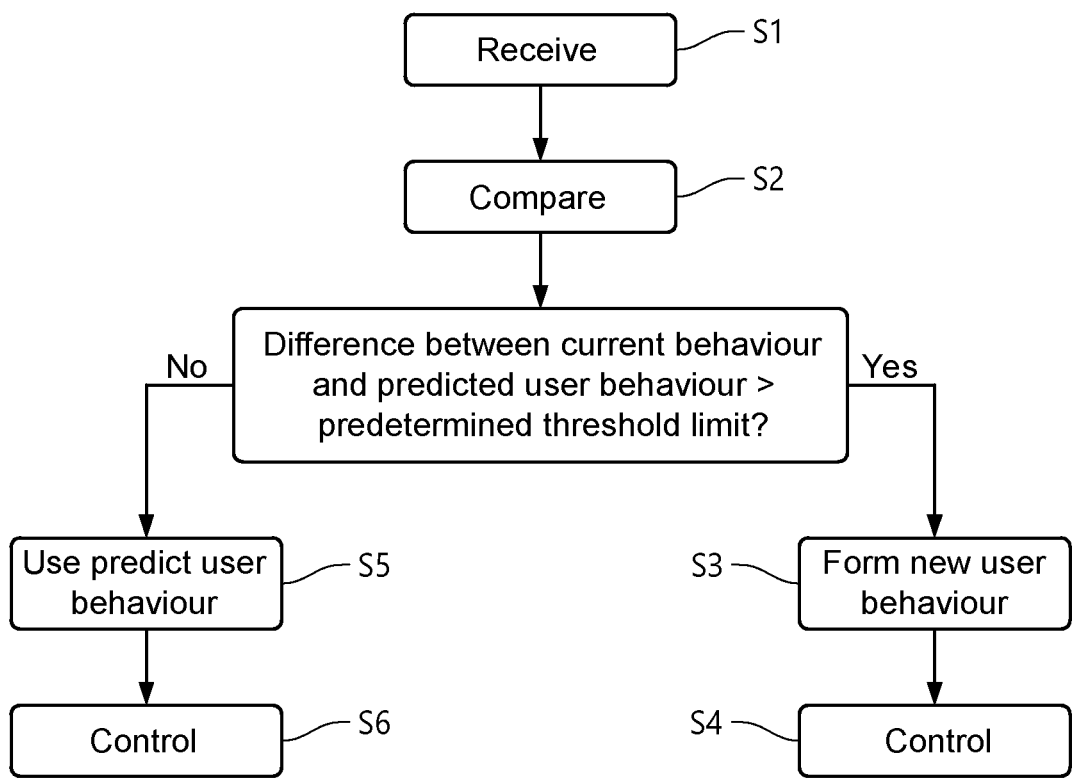
FIG. 6 is a flow chart of a method of a controlling a vehicle operation according to an example embodiment.

Reference is now made to FIG. 3 in combination with FIG. 6, in which FIG. 3 is a schematic illustration of a vehicle control system 300 (or also simply referred to as a system 300) for controlling a vehicle operation according to an example embodiment, and FIG. 6 is a flow chart of a method of controlling a vehicle operation according to an example embodiment. The system 300 comprises the above described control unit 202. The system also comprises a user behavior module 302. The user behavior module 302 is configured to determine a current user behavior for a user currently operating the vehicle 1. The user behavior can, for example, be how the user is operating the vehicle, i.e. an acceleration/deceleration behavior, a vehicle speed profile, etc. The user behavior can also relate to the specific road the vehicle 1 is currently operated. The user behavior module 302 may thus comprise a positioning system, such as e.g. a GPS, etc. The user behavior module 302 is coupled to the control unit 202 and configured to transmit a signal indicative of the current user behavior to the control unit 202.

The system 300 also comprises the above described vehicle component 10, 20, 30, 40. For simplifying the reading of the present disclosure, the vehicle component will in the following only be referred to as the non-limiting engine after treatment system (EATS) 40. The EATS 40 is coupled to, and controlled by, the control unit 202.

During operation, the user behavior module 302 transmits a signal to the processing circuitry of the control unit 202. Hence, the processing circuitry receives S1 a signal from the user behavior module 302. The signal is indicative of a current user behavior or the vehicle 1. As described above, the current user behavior is thus an indication of how and/or where the vehicle is operated. The processing circuitry compares S2 the current user behavior with a predicted user behavior. The predicted user behavior is preferably stored in the above described memory 204 and is indicative of how the user of the vehicle is conventionally operating the vehicle and/or where the user is conventionally driving the vehicle, i.e. the specific destination operable by the user.

When the processing circuitry determines that a difference between the current user behavior and the predicted user behavior is above a predetermined threshold limit, the processing circuitry determines that the current user behavior differs too much from what can be expected from the user conventionally operating the vehicle. The vehicle is thus most likely operated by a new user, or is operated towards a different destination, i.e. has been received a new transport mission. In such situation, the EATS 40 should preferably not be controlled in a similar manner as has been previously made. For example, when operating the vehicle according to the predicted user behavior, the regeneration of the EATS 40 was controlled at specific point in time when it was suitable to do so, such as when cruising at a highway or motorway. Since the current user behavior is different from the predicted user behavior, it cannot be assured that the exemplified regeneration of the EATS 40 should be performed at the same point in time as when the vehicle 1 is operated according to the predicted user behavior.

When the difference between the current user behavior and the predicted user behavior is above the predetermined threshold limit, the processing circuitry forms S3 new user behavior which is based on the current user behavior. The processing circuitry thereafter controls S4 the EATS 40 using the new user behavior in order to not regenerate the EATS 40 at an unsuitable point in time. Preferably, and according to an example, the processing circuitry also removes all data relating to the predicted user behavior when the difference between current user behavior and the predicted user behavior is above the predetermined threshold limit, i.e. when or before forming the new user behavior.

However, should the processing circuitry determine that the difference between the current user behavior and the predicted user behavior is below the predetermined threshold limit, the processing circuitry continue to use S5 the predicted user behavior and controls S6 the EATS 40 to regenerate at the conventional points in time.

In order to describe the invention in a more illustrative purpose, reference is made to FIGS. 4a-5c. FIGS. 4a-5c illustrate the point in time when the EATS 40 is regenerated. The horizontal x-axis 410 thus represents a time scale, while the vertical y-axis 420 represents the probability level of vehicle usage. With initial reference to FIGS. 4a and 5a, the vehicle 1 is operated and the processing circuitry receives the signal indicative of the current user behavior 402 (illustrated with solid lines) from the user behavior module 302. As described above, the processing circuitry compares the current user behavior 402 with the predicted user behavior 404 (illustrated with dashed lines), which predicted user behavior is stored in the memory 204. As can be seen, the predicted user behavior 404, i.e. the predicted probability level of vehicle usage, does not correspond to the current user behavior, i.e. the current level of vehicle usage. The processing circuitry thus determines that the difference between the current user behavior 402 and the predicted user behavior 404 is too severe, i.e. is above the predetermined threshold limit.

Figure 4A:
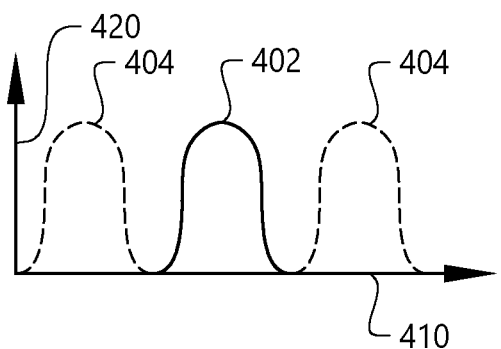
FIGS. 4a-4d are graphs illustrating the operation of a vehicle component without the use of the inventive method according to an example embodiment.
Figure 4B:
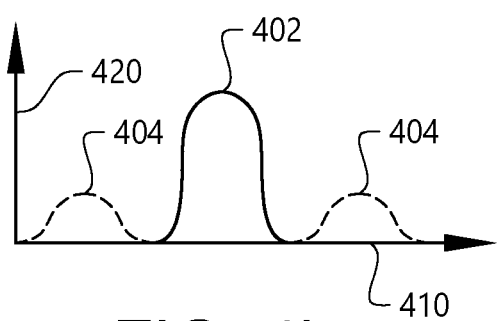
Figure 5B:
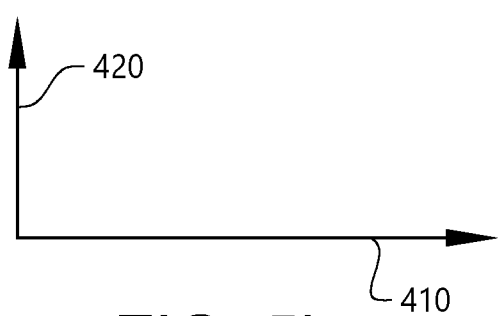

Next, and with reference to FIG. 5b, the processing circuitry has removed the historical data relating to the predicted used behavior. As a comparison, reference is made to FIG. 4b, in which the historical data is still present. In FIG. 4b, it can still not be fully assured when to regenerate the EATS 40 since the historical data is still present and the processing circuitry has not been fully adapted to the new user behavior.

Figure 4C:
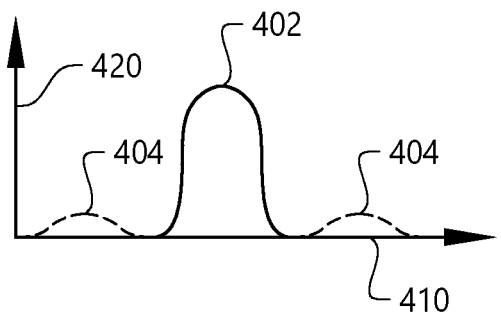
Figure 5C:
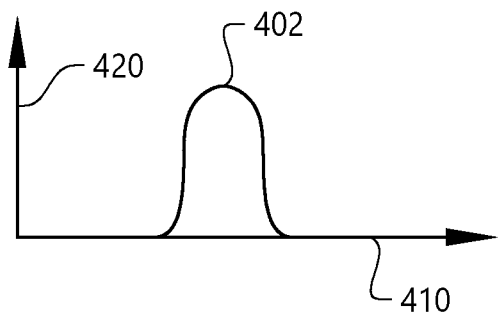
Figure 4D:
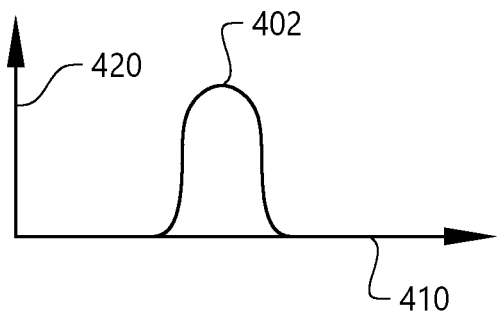

In FIG. 4c, the historical data has still not been completely removed, and the processing circuitry has at this point in time not yet been fully adapted to the new user behavior. In FIG. 5c on the other hand, which corresponds to the same point in time as FIG. 4c, the historical data is completely removed, and the processing circuitry has been adapted to the new user behavior. As can be seen in FIGS. 4a-5c, when not removing the historical data when the difference between the current user behavior and the predicted user behavior is above the predetermined threshold limit, the processing circuitry adapts to the new user behavior first in FIG. 4d.

Accordingly, the present invention enables for a more rapid adaption to a new user, or a new user behavior. Hence, when the vehicle is operated by a new user, or when the previous user has been given a new assignment differing from a previous assignment route, the processing circuitry rapidly adapts to the new user behavior, where it can be assured that the EATS 40 is regenerated at a suitable point in time.

In order not to change between user behavior too often or to further assure that it actually is a new user behavior and not a temporary user behavior, the current user behavior may be compared with the predicted user behavior for a predetermined time period when the user is currently operating the vehicle. Also, the processing circuitry hereby forms new user behavior when the difference between the current user behavior and the predicted user behavior is above the predetermined threshold limit throughout the predetermined time period.

It is to be understood that the present disclosure is not limited to the embodiments described above and illustrated in the drawings; rather, the skilled person will recognize that many changes and modifications may be made within the scope of the appended claims.

The invention claimed is:

1. A computer implemented method of controlling a vehicle operation of a vehicle, the vehicle comprising vehicle components operable by processing circuitry based on predicted user behavior, the method comprising:
   receiving, by the processing circuitry, a signal indicative of a current user behavior for a user currently operating the vehicle;
   comparing, by the processing circuitry, the current user behavior with a predicted user behavior; and when a difference between the current user behavior and the predicted user behavior is above a predetermined threshold limit:
   removing, by the processing circuitry, historical data relating to the predicted user behavior;
   forming, by the processing circuitry, new user behavior based on the current user behavior; and
   controlling, by the processing circuitry, operation of at least one of the vehicle components using the new user behavior.

2. The computer implemented method according to claim 1, wherein the step of removing the historical data is executed by the processing circuitry prior to forming the new user behavior.

3. The computer implemented method according to claim 1, wherein the current user behavior is compared with the predicted user behavior for a predetermined time period when the user is currently operating the vehicle.

4. The computer implemented method according to claim 3, wherein the processing circuitry forms the new user behavior when the difference between the current user behavior and the predicted user behavior is above the predetermined threshold limit throughout the predetermined time period.

5. The computer implemented method according to claim 1, wherein the predicted user behavior is a road path at which the user is predicted to operate the vehicle.

6. The computer implemented method according to claim 5, wherein the difference between the current user behavior and the predicted user behavior is above the predetermined threshold limit when the vehicle is currently operated at a road path different from the predicted road path.

7. The computer implemented method according to claim 1, wherein the predicted user behavior is a power consumption of the vehicle during a predetermined time period.

8. The computer implemented method according to claim 7, wherein the difference between the current user behavior and the predicted user behavior is above the predetermined threshold limit when the current power consumption falls outside a predetermined power consumption range during a predetermined time period.

9. The computer implemented method according to claim 1, wherein the vehicle component is an engine aftertreatment system, the method comprising:
controlling, by the processing circuitry, the engine aftertreatment system to regenerate at a predetermined time interval based on the new user behavior.

10. The computer implemented method according to claim 1, wherein the vehicle component is an electric power system of the vehicle, the method comprising:
controlling, by the processing circuitry, to feed electric power to an energy storage system of the vehicle based on the new user behavior.

11. A non-transitory computer readable medium carrying a computer program comprising program code for performing the steps of claim 1 when the program code is run on a computer.

12. A vehicle control system for controlling a vehicle operation, the vehicle control system comprising a control unit comprising processing circuitry configured to control operation of at least one vehicle component, the processing circuitry being configured:
receive a signal indicative of a current user behavior for a user currently operating the vehicle;
compare the current user behavior with a predicted user behavior;
and when a difference between the current user behavior and the predicted user behavior is above a predetermined threshold limit:
remove historical data relating to the predicted user behavior;
form new user behavior based on the current user behavior; and
control operation of the at least one vehicle component using the new user behavior.

13. A vehicle comprising a vehicle control system according to claim 12.

* * * * *